United States Patent
Zhu et al.

(10) Patent No.: US 12,536,172 B2
(45) Date of Patent: Jan. 27, 2026

(54) DATA QUERY OPTIMIZATION METHOD, ELECTRONIC DEVICE AND STORAGE MEDIUM

(71) Applicant: Beijing Baidu Netcom Science Technology Co., Ltd., Beijing (CN)

(72) Inventors: Chenchang Zhu, Beijing (CN); Jialin Feng, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/747,068

(22) Filed: Jun. 18, 2024

(65) Prior Publication Data

US 2025/0124031 A1    Apr. 17, 2025

(30) Foreign Application Priority Data

Oct. 16, 2023   (CN) .......................... 202311337622.9

(51) Int. Cl.
*G06F 16/2453*    (2019.01)
*G06F 11/34*      (2006.01)
*G06F 16/2455*    (2019.01)

(52) U.S. Cl.
CPC .... *G06F 16/24542* (2019.01); *G06F 11/3409* (2013.01); *G06F 16/2456* (2019.01)

(58) Field of Classification Search
CPC .......... G06F 16/24542; G06F 11/3409; G06F 16/2456; G06F 16/2453; G06F 16/2433; G06F 16/27

See application file for complete search history.

(56) References Cited

U.S. PATENT DOCUMENTS

| | | | | |
|---|---|---|---|---|
| 7,233,939 B1 * | 6/2007 | Ziauddin | ............ | G06F 16/2453 |
| | | | | 707/718 |
| 7,984,043 B1 * | 7/2011 | Waas | .................. | G06F 16/8358 |
| | | | | 707/718 |
| 9,460,154 B2 * | 10/2016 | Bellamkonda | .... | G06F 16/24556 |
| 10,496,646 B2 * | 12/2019 | Hill | .................. | G06F 16/24545 |
| 10,614,066 B2 * | 4/2020 | Gawande | ............. | G06F 16/282 |
| 11,294,961 B2 * | 4/2022 | Kuwabara | .......... | G06F 16/90328 |
| 11,907,218 B1 * | 2/2024 | Chakkappen | ......... | G06F 16/972 |
| 12,008,005 B2 * | 6/2024 | Kondiles | ............ | G06F 16/24553 |
| 2023/0359626 A1 * | 11/2023 | Park | ....................... | G06N 20/00 |

* cited by examiner

*Primary Examiner* — Debbie M Le
(74) *Attorney, Agent, or Firm* — Faegre Drinker Biddle & Reath LLP

(57) ABSTRACT

Provided is a data query optimization method, an electronic device and a storage medium, relating to the field of data processing technology and in particular to the technical fields of distributed database, big data, cloud computing and others. The method includes: determining a plurality of candidate execution plans for a target query request; determining execution costs of the plurality of candidate execution plans; updating the execution costs of the plurality of candidate execution plans based on monitoring data of data nodes involved in the plurality of candidate execution plans, to obtain final costs of the plurality of candidate execution plans; and screening out a final execution plan for the target query request from the plurality of candidate execution plans based on the final costs of the plurality of candidate execution plans.

18 Claims, 4 Drawing Sheets

DATA QUERY OPTIMIZATION METHOD, ELECTRONIC DEVICE AND STORAGE MEDIUM

CROSS-REFERENCE TO RELATED APPLICATIONS

The present application claims the priority from Chinese Patent Application No. 202311337622.9, filed with the Chinese Patent Office on Oct. 16, 2023, the content of which is hereby incorporated herein by reference in its entirety.

TECHNICAL FIELD

The present disclosure relates to the field of data processing, and in particular to technical fields of distributed database, big data, cloud computing and others.

BACKGROUND

The SQL (Structured Query Language) requests in the database can usually be implemented through multiple kinds of execution plans. Different execution plans may require different execution costs. In a scenario of a distributed database, especially a cloud distributed database, how to determine an appropriate execution plan from a plurality of execution plans is a problem that needs to be solved urgently.

SUMMARY

The present disclosure provides a data query optimization method and apparatus, a device and a storage medium.

According to one aspect of the present disclosure, provided is a data query optimization method, including:
  determining a plurality of candidate execution plans for a target query request;
  determining execution costs of the plurality of candidate execution plans;
  updating the execution costs of the plurality of candidate execution plans based on monitoring data of data nodes involved in the plurality of candidate execution plans, to obtain final costs of the plurality of candidate execution plans; and
  screening out a final execution plan for the target query request from the plurality of candidate execution plans based on the final costs of the plurality of candidate execution plans.

According to another aspect of the present disclosure, provided is a data query optimization apparatus, including:
  a first determining module configured to determine a plurality of candidate execution plans for a target query request;
  a second determining module configured to determine execution costs of the plurality of candidate execution plans;
  an updating module configured to update the execution costs of the plurality of candidate execution plans based on monitoring data of data nodes involved in the plurality of candidate execution plans, to obtain final costs of the plurality of candidate execution plans; and
  a screening module configured to screen out a final execution plan for the target query request from the plurality of candidate execution plans based on the final costs of the plurality of candidate execution plans.

According to yet another aspect of the present disclosure, provided is an electronic device, including:

at least one processor; and
a memory connected in communication with the at least one processor;
where the memory stores an instruction executable by the at least one processor, and the instruction, when executed by the at least one processor, enables the at least one processor to execute the method of any embodiment of the present disclosure.

According to yet another aspect of the present disclosure, provided is a non-transitory computer-readable storage medium storing a computer instruction thereon, and the computer instruction is used to cause a computer to execute the method of any embodiment of the present disclosure.

According to yet another aspect of the present disclosure, provided is a computer program product including a computer program, and the computer program implements the method of any embodiment of the present disclosure, when executed by a processor.

In the embodiment of the present disclosure, after the execution costs of the plurality of candidate execution plans are determined, each execution cost is updated in combination with the monitoring data of the data node, and the final costs of the execution plans are used as reference for the final execution plan for the target query request. The final execution cost not only takes into account the estimated cost of the execution plan and the status of the database itself, but also takes into account the situation of the data node itself of the execution plan, facilitating an increase in accuracy of the final cost, thereby facilitating an increase in accuracy of the final execution plan for the target query request obtained based on the final cost, and facilitating the optimization of data query based on the final execution plan.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope of the present disclosure. Likewise, for clarity and conciseness, descriptions of well-known functions and structures are omitted in the following descriptions.

Moreover, the terms "first" and "second" are only for the purpose of description, and cannot be construed to indicate or imply the relative importance or implicitly point out the number of technical features indicated. Therefore, the feature defined with "first" or "second" may explicitly or implicitly include one or more features. In the description of the present disclosure, "a plurality of" means two or more than two, unless otherwise expressly and specifically defined.

Figure 1:
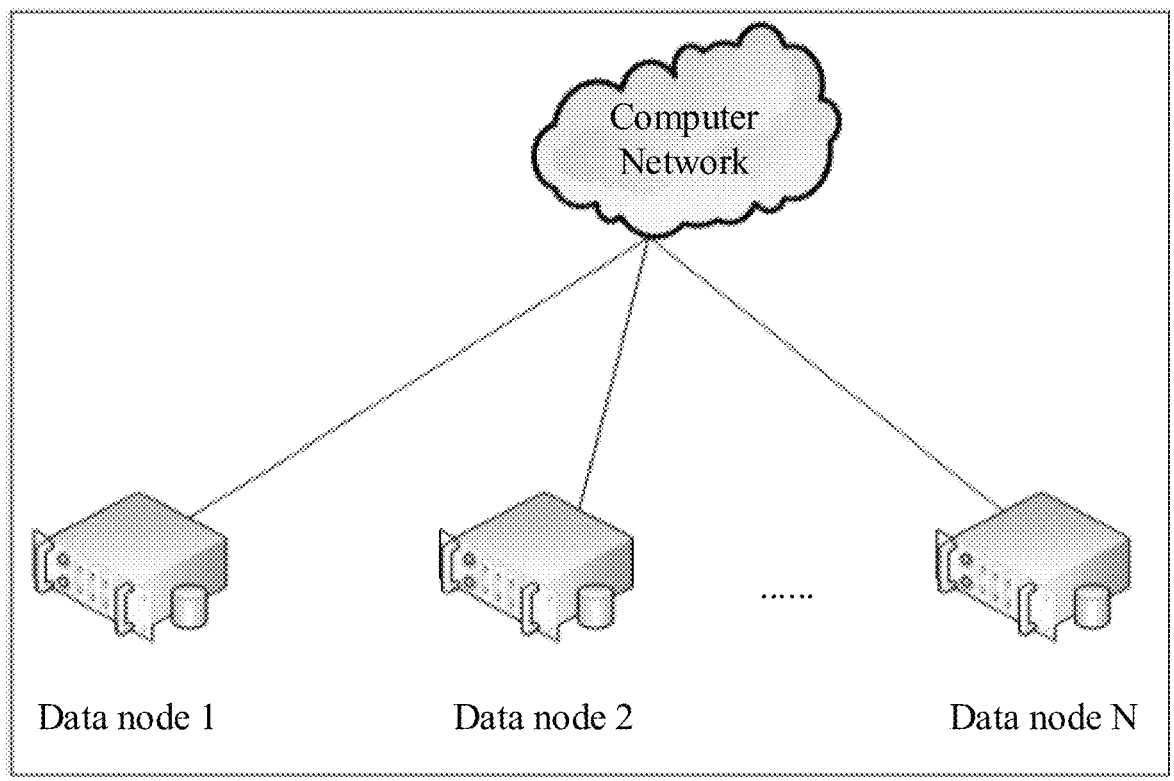
FIG. 1 is a schematic diagram of a distributed database scenario according to an embodiment of the present disclosure.

In the related art, for different execution plans for an SQL request, a query optimizer is usually used to compare and screen the execution plans to determine an optimal execution plan, and the optimal execution plan is generally an execution plan with the lowest execution cost. In the query optimizer, the CBO (Cost Based Optimizer) method may be used to estimate and compare the costs (i.e., execution costs) of the execution plans. The CBO generally uses three parts of statistical data within the database to estimate the costs, including the estimated I/O (Input/Output) cost, the estimated CPU (Central Processing Unit) cost and the estimated network cost for the execution plan. For a single-node database, the CBO method can generally achieve the accurate cost judgment. But in a distributed database scenario, as shown in FIG. 1, which is a schematic diagram of the distributed database scenario, there may be a plurality of data nodes, such as data node 1, data node 2, . . . , data node N (N is a positive integer) in FIG. 1. The performance states of the data nodes may be different, and the network transmission costs between the data nodes may also be different. That is, the execution cost of the same SQL request may vary for different data nodes.

In order to meet user demands, the cloud distributed database product usually has the function of monitoring the data of each data node, so there is no need to introduce an additional monitoring tool to obtain the data of the data nodes. If the monitored data of the data nodes can be added to the cost calculation, the data can help the query optimizer accurately control the data processing capability of each data node, making the calculated cost more accurate, and thus making the cost-based query optimization more accurate.

Figure 2:
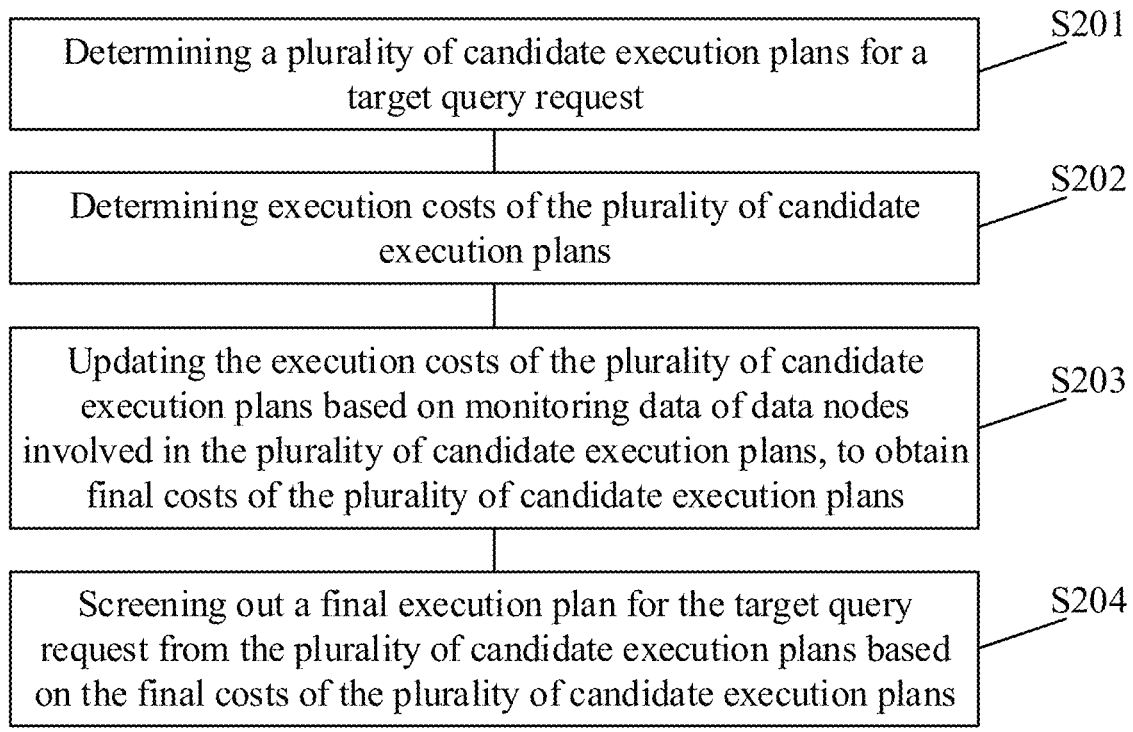
FIG. 2 is a schematic flowchart of a data query optimization method according to another embodiment of the present disclosure.

In view of this, an embodiment of the present disclosure provides a data query optimization method. As shown in FIG. 2, it is a schematic flowchart of the data query optimization method in the embodiment of the present disclosure, including:

S201: determining a plurality of candidate execution plans for a target query request.

Here, the plurality of candidate execution plans can process the target query request to obtain a query result. The response to the target query request may be achieved based on any candidate execution plan among the plurality of candidate execution plans.

S202: determining execution costs of the plurality of candidate execution plans.

For example, the determination of the execution costs may be implemented using a query optimizer. Here, the query optimizer is used to screen out an optimal execution plan from the plurality of candidate execution plans. In order to implement the screening process, the query optimizer firstly calculates the execution cost of each candidate execution plan, to use the execution cost as the screening basis.

S203: updating the execution costs of the plurality of candidate execution plans based on monitoring data of data nodes involved in the plurality of candidate execution plans, to obtain final costs of the plurality of candidate execution plans.

Here, the candidate execution plan may involve one or more data nodes. The monitoring data of a data node refers to the monitoring data of the data node where the database is located, in addition to the monitoring data related to the database itself. For example, the monitoring data may be the currently-used CPU resources and the idle and available CPU resources on the data node.

S204: screening out a final execution plan for the target query request from the plurality of candidate execution plans based on the final costs of the plurality of candidate execution plans.

In the embodiment of the present disclosure, after the execution costs of the plurality of candidate execution plans are determined, each execution cost is updated in combination with the monitoring data of the data node, and the final costs of the execution plans are used as reference for the final execution plan for the target query request. The final execution cost not only takes into account the estimated cost of the execution plan and the status of the database itself, but also takes into account the situation of the data node itself of the execution plan, facilitating an increase in accuracy of the final cost, thereby facilitating an increase in accuracy of the final execution plan for the target query request obtained based on the final cost, and facilitating the optimization of data query based on the final execution plan.

In some embodiments, the monitoring data includes at least one: processor usage rate, network status, network delay parameter, task planning to be executed, etc.

Here, the processor usage rate mainly includes CPU usage rate, which refers to a ratio between the workload of the central processing unit of the computer and the available processing capability thereof, is an important indicator to measure the CPU utilization efficiency and can reflect the performance and effectiveness of the system. It should be noted that, if the CPU usage rate exceeds the CPU performance threshold, meaning that the CPU is bearing a heavy workload, the response speed of the system may become slow or even a phenomenon of stalling may occur. Therefore, the use of the CPU usage rate as the monitoring data is conducive to enabling the screened-out execution plan to be successfully and efficiently executed on the corresponding data node.

The network status refers to the connection between the data node and the network. For example, the network status may be good, poor or disconnected when surfing the Internet. The network status is usually affected by some factors, such as network signal strength, network speed, bandwidth, etc. When the network condition is good, the connection status between the data node and the network is stable, the data transmission speed is fast, and the system response speed is fast. When the network condition is poor, the system response speed may slow down, the network may freeze, or even the network may fail to connect, etc. Therefore, the use of the network status as the monitoring data is conducive to enabling the screened-out execution plan to be successfully and efficiently executed on the corresponding data node.

The network delay parameter is used to indicate the network delay condition, and is used to indicate the delay condition of the data node in the embodiment of the present disclosure. For example, when a request is sent to a data node and the data node responds to the request one hour later, the delay for the data node to send and receive information in that direction is the node delay. If a serious delay occurs on a data node, the execution efficiency of the execution plan may be affected. Therefore, the use of the network delay parameter as the monitoring data is conducive to enabling the screened-out execution plan to be successfully and efficiently executed on the corresponding data node.

In the data node, other tasks to be executed usually need to be processed, in addition to the execution plan of the database. The task planning to be executed is the planning for other tasks to be executed. If there are too many other tasks to be executed, the processing efficiency of the data node for the execution plan of the database may be affected. Therefore, the use of the task planning to be executed as the monitoring data is conducive to enabling the screened-out execution plan to be successfully and efficiently executed on the corresponding data node.

In the embodiment of the present disclosure, the monitoring data may be composed of multiple monitoring items. The more monitoring items there are, the more comprehensive the obtained monitoring data and the richer the reference basis, facilitating an increase in accuracy of the final cost of the candidate execution plan obtained based on the monitoring data, thereby facilitating an increase in accuracy of the final execution plan for the target query request obtained based on the final cost, and facilitating the optimization of data query based on the final execution plan.

The cases where the monitoring data may include at least one of the processor usage rate, network status, network delay parameter and task planning to be executed will be respectively illustrated below.

In some embodiments, the execution costs of all the candidate execution plans may be updated based on a positive correlation between the final cost and the processor usage rate, to obtain the final cost of each candidate execution plan.

In other embodiments, when the monitoring data includes the processor usage rate, the step of updating the execution costs of the plurality of candidate execution plans may be implemented as follows: for a plurality of first target execution plans with differences between execution costs less than a first difference threshold, updating the execution costs of the plurality of first target candidate execution plans based on a positive correlation between the final cost and the processor usage rate.

Since the execution costs of the plurality of candidate execution plans may be different, the execution costs of different candidate execution plans may generally differ. If the execution costs of the candidate execution plans differ greatly, the candidate execution plan with the lower execution cost is selected as the final execution plan. If the execution costs of the candidate execution plans are approximate, the execution costs of the candidate execution plans need to be updated, so as to determine the optimal final execution plan from the plurality of candidate execution plans based on the final costs. Based on this, the setting of the first difference threshold can facilitate the determination of the difference relationship between the execution costs of the candidate execution plans, and the difference relationship is used to reflect whether the execution costs of the candidate execution plans are approximate. The above-mentioned first target execution plans are execution plans with differences between execution costs less than the first difference threshold among the plurality of candidate execution plans, and the execution costs of the plurality of first target execution plans are approximate. Here, the first difference threshold may be formulated according to actual requirements, and is not limited in the present disclosure. For example, the first difference threshold may be 1, 2 or 3.

As the processor usage rate increases, the final costs of the first target execution plans will increase to a certain extent; and as the processor usage rate decreases, the final costs of the first target execution plans will decrease to a certain extent. Therefore, the execution costs of the first target execution plans need to be updated according to the processor usage rate, to obtain the updated final costs of the execution plans.

In an embodiment of the present disclosure, when the monitoring data includes the processor usage rate, for a plurality of first target execution plans with differences between execution costs less than the first difference threshold, that is, the first target execution plans with approximate execution costs, the execution cost of each first target execution plan is updated in combination with the processor usage rate to obtain the final cost. The query optimization based on the final cost is conducive to making the final cost more accurately represent the actual execution cost of the candidate execution plan, and thus making the query optimization result more accurate.

In some embodiments, when the monitoring data includes the network status, the step of updating the execution costs of the plurality of candidate execution plans may be implemented as follows:

Step A1: determining a degree of network congestion based on the network status.

Here, the degree of network congestion refers to a degree of congestion occurring when the port traffic of a data node in the network reaches a certain level. Generally, the degree of network congestion may be judged by the following indicators in the network status, including: port utilization, data packet loss rate, etc. Specifically, the port utilization refers to a ratio between the bandwidth already used and the remaining available bandwidth on the port. When the port utilization exceeds a threshold, it indicates that the port may be congested. For example, when the port utilization reaches 80% to 90% or more, the network congestion may occur. When the port is congested, the transmitted data packet may be lost. The data packet loss rate usually refers to a ratio of the lost data packets to the total data packets sent on the port per unit time. The higher the data packet loss rate, the more severe the network congestion.

Step A2: for a plurality of second target execution plans with differences between execution costs less than a second difference threshold, updating the execution costs of the plurality of second target candidate execution plans based on a positive correlation between the final cost and the degree of network congestion.

As the degree of network congestion increases, the final costs of the second target execution plans will increase to a certain extent; and as the degree of network congestion decreases, the final costs of the second target execution plans will decrease to a certain extent. Therefore, for the plurality of second target execution plans with approximate execution costs, the execution costs of the second target execution plans need to be updated in combination with the degree of network congestion in the monitoring data, so as to determine the optimal final execution plan from the plurality of second target execution plans based on the final costs.

In an embodiment of the present disclosure, when the monitoring data includes the degree of network congestion, for a plurality of second target execution plans with differences between execution costs less than the second difference threshold, that is, the second target execution plans with approximate execution costs, the execution cost of each second target execution plan is updated in combination with the degree of network congestion to obtain the final cost. The query optimization based on the final cost is conducive to making the final cost more accurately represent the actual execution cost of the candidate execution plan, and thus making the query optimization result more accurate.

In some embodiments, when the monitoring data includes the network delay parameter, the step of updating the execution costs of the plurality of candidate execution plans may be implemented as follows: for a plurality of third target execution plans with differences between execution costs less than a third difference threshold, updating the execution costs of the plurality of third target candidate execution plans based on a positive correlation between the final cost and the network delay parameter.

Here, the network delay parameter represents the network delay situation, meaning that the time required for a data packet in the transmission process is increased due to the port congestion of a data node in the network. Since there is a certain degree of delay in the normal transmission process of the data packet, the transmission time of the data packet is increased, that is, the delay is increased. The delay refers to the time it takes for the data packet to be transmitted from the sender to the receiver. The increase in delay will degrade the network performance and user experience. The network delay parameter may include, for example, message response time, where the message response time refers to a time interval from sending a request to receiving a response to the request. When a port in the network is congested, the message response time will be extended. When the congestion is serious, the message response time will be increased significantly.

As the network delay situation represented by the network delay parameter becomes more and more serious, the final cost of the execution plan will be increased to a certain extent; and as the network delay situation represented by the network delay parameter is alleviated, the final cost of the execution plan will be reduced to a certain extent. Therefore, when the execution costs of the third target execution plans are approximate, the execution costs of the third target execution plans need to be updated in combination with the network delay parameter in the monitoring data, so as to determine the optimal final execution plan from the plurality of third target execution plans based on the final costs.

In an embodiment of the present disclosure, when the monitoring data includes the network delay parameter, for a plurality of third target execution plans with differences between execution costs less than the third difference threshold, that is, the third target execution plans with approximate execution costs, the execution cost of each third target execution plan is updated in combination with the network delay parameter to obtain the final cost. The query optimization based on the final cost is conducive to making the final cost more accurately represent the actual execution cost of the candidate execution plan, and thus making the query optimization result more accurate.

In some embodiments, when the monitoring data includes the task planning to be executed, the step of updating the execution costs of the plurality of candidate execution plans may be implemented as follows:

Step B1: estimating the amount of node resources consumed by the task planning to be executed within a specified duration in future.

Here, the time range of the specified duration in future may be determined according to actual requirements, and is not limited in the present disclosure. The node resources required for the task planning to be executed are not necessarily of the same order of magnitude. For example, the task planning to be executed may require a certain amount of idle network bandwidth and CPU available margin, but the network bandwidth and CPU resources are not of the same order of magnitude. When the node resources consumed by the task planning to be executed are of different orders of magnitude, the normalized de-dimensionalization may be performed on these node resources, and the node resources processed to be of the same order of magnitude are added together as the amount of node resources consumed by the task planning to be executed.

Step B2: for a plurality of fourth target execution plans with differences between execution costs less than a fourth difference threshold, updating the execution costs of the plurality of fourth target candidate execution plans based on a positive correlation between the final cost and the amount of node resources.

As the number of tasks to be executed increases, the final costs of the execution plans will increase to a certain extent; and as the number of tasks to be executed decreases, the final costs of the execution plans will decrease to a certain extent. For the fourth target execution plans with approximate execution costs, the execution costs of the candidate execution plans need to be updated in combination with the task planning to be executed in the monitoring data, so as to determine the optimal final execution plan from the plurality of candidate execution plans based on the final costs.

In an embodiment of the present disclosure, when the monitoring data includes the task planning to be executed, for a plurality of fourth target execution plans with differences between execution costs less than the fourth difference threshold, that is, the fourth target execution plans with approximate execution costs, the execution cost of each fourth target execution plan is updated in combination with the task planning to be executed to obtain the final cost. The query optimization based on the final cost is conducive to making the final cost more accurately represent the actual execution cost of the candidate execution plan, and thus making the query optimization result more accurate.

Figure 3:
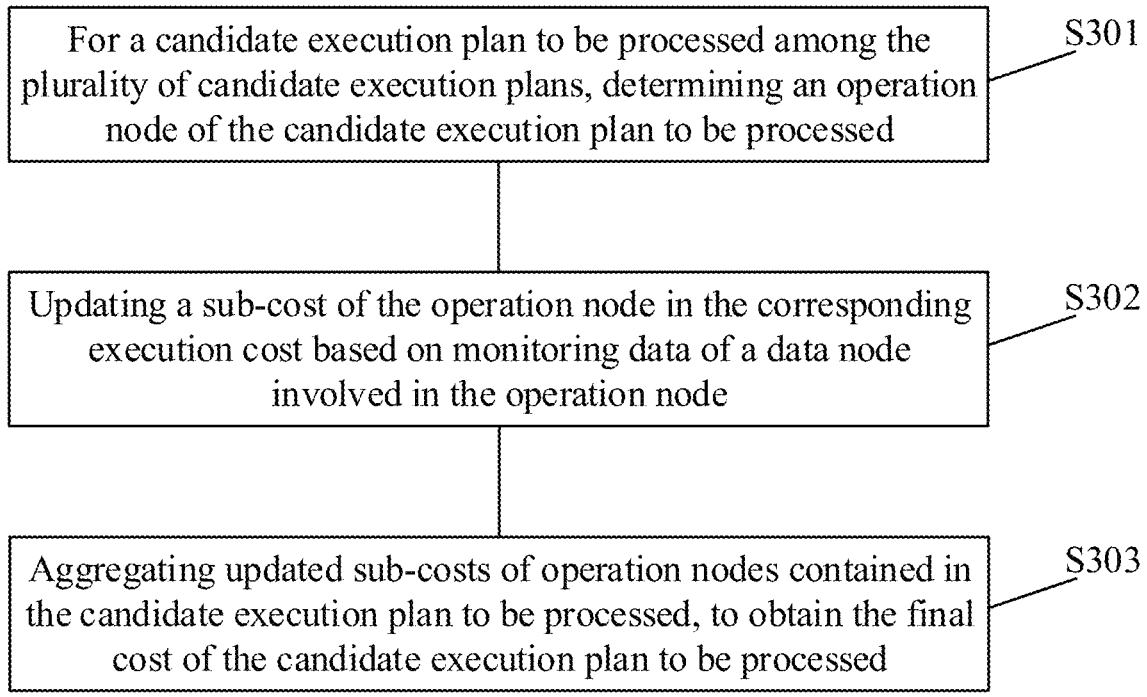
FIG. 3 is a schematic flowchart of updating execution costs according to another embodiment of the present disclosure.

In some embodiments, as shown in FIG. 3, it is a schematic flowchart of updating execution costs in an embodiment of the present disclosure. Here, the step of updating the execution costs of the plurality of candidate execution plans based on the monitoring data of the data nodes involved in the plurality of candidate execution plans includes:

S301: for a candidate execution plan to be processed among the plurality of candidate execution plans, determining an operation node of the candidate execution plan to be processed.

Here, the candidate execution plan to be processed may be any one of the plurality of candidate execution plans. The candidate execution plan to be processed may contain one or more operation nodes. For example, the candidate execution plan to be processed may need to be completed after passing through a plurality of operation nodes.

S302: updating a sub-cost of the operation node in the corresponding execution cost based on monitoring data of a data node involved in the operation node.

Here, the operation node may involve different data nodes, and the node resource amounts required for different data nodes of the candidate execution plan to be processed may also be different. For each data node, the sub-cost required to complete the candidate execution plan to be processed can be updated based on the monitoring data.

S303: aggregating updated sub-costs of operation nodes contained in the candidate execution plan to be processed, to obtain the final cost of the candidate execution plan to be processed.

Figure 4:
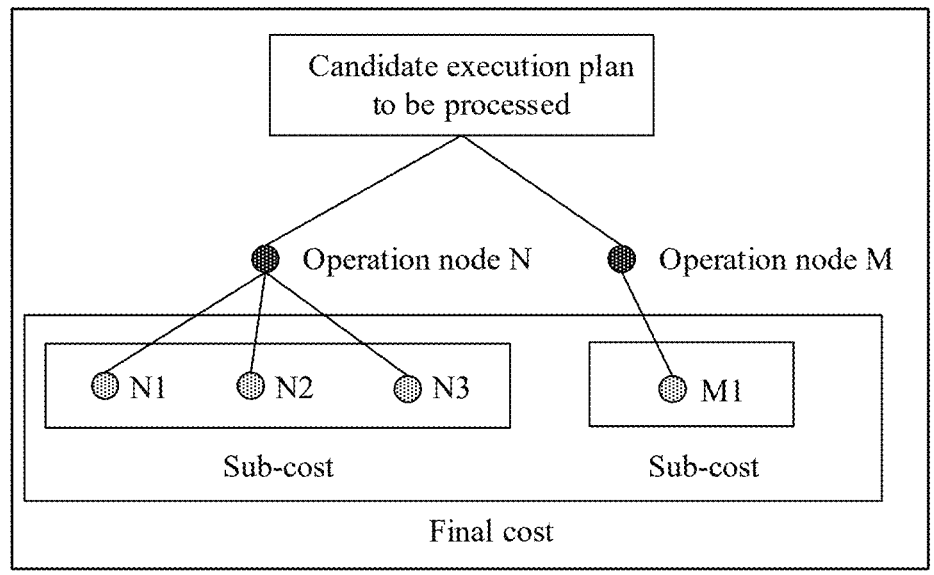
FIG. 4 is a schematic diagram of aggregating sub-costs of operating nodes according to another embodiment of the present disclosure.

As shown in FIG. 4, it is a schematic diagram of aggregating sub-costs of operation nodes in an embodiment of the present disclosure. In FIG. 4, the candidate execution plan to be processed includes two operation nodes, namely operation node N and operation node M, where the operation node N involves three data nodes, namely data nodes N1, N2 and N3; and the operation node M involves one data node M1. Each operation node has a corresponding sub-cost, and the sum of the sub-costs constitutes the final cost of the candidate execution plan to be processed.

In an embodiment of the present disclosure, the sub-costs of the operation nodes contained in the candidate execution plan to be processed are aggregated, and the aggregated sub-costs are used as the execution cost of the candidate execution plan to be processed. When the candidate execution plan to be processed contains a plurality of sub-costs, it is beneficial to avoid the omission of execution costs, thereby facilitating the improvement of the accuracy of the execution costs and facilitating the implementation of the accuracy of query optimization based on the execution costs.

It should be noted that the first difference threshold, the second difference threshold, the third difference threshold and the fourth difference threshold for evaluating the difference between execution costs may be the same or different according to actual requirements.

In some embodiments, according to actual requirements, for the execution plans with approximate execution costs and focusing on the optimization of the processor usage rate, for example, for the execution plans with high computing requirements, the processor usage rate may be preferentially incorporated into the monitoring data as a monitoring item; for the execution plans with approximate execution costs and focusing on the optimization of the network status, for example, a candidate execution plan to be processed contains a plurality of operation nodes, and then the data transmission among the plurality of operation nodes is involved. Then the network bandwidth resources required by this execution plan to be processed may be more than those of the execution plan to be processed that contains only one operation node, so the network status may be preferentially incorporated into the monitoring data as a monitoring item. The same can be said for optimization schemes in which other monitoring items may be contained in the monitoring data, so that the collection of the monitoring data is more reasonable according to actual requirements. For example, the collection of the monitoring data related to the network status may be reduced or not performed in the case of focusing on the optimization of the processor usage rate, thereby improving the processing efficiency of the query optimizer for the monitoring data to a certain extent. On this basis, for example, for the execution plans with approximate execution costs that need to consider both the optimization of the processor usage rate and the optimization of the network status, the weighted summation may be performed on the processor usage rate and the network status in combination with the emphasis on optimizing the processor usage rate and optimizing the network status to obtain a reference value, and then the execution costs are updated in combination with the reference value.

Figure 5:
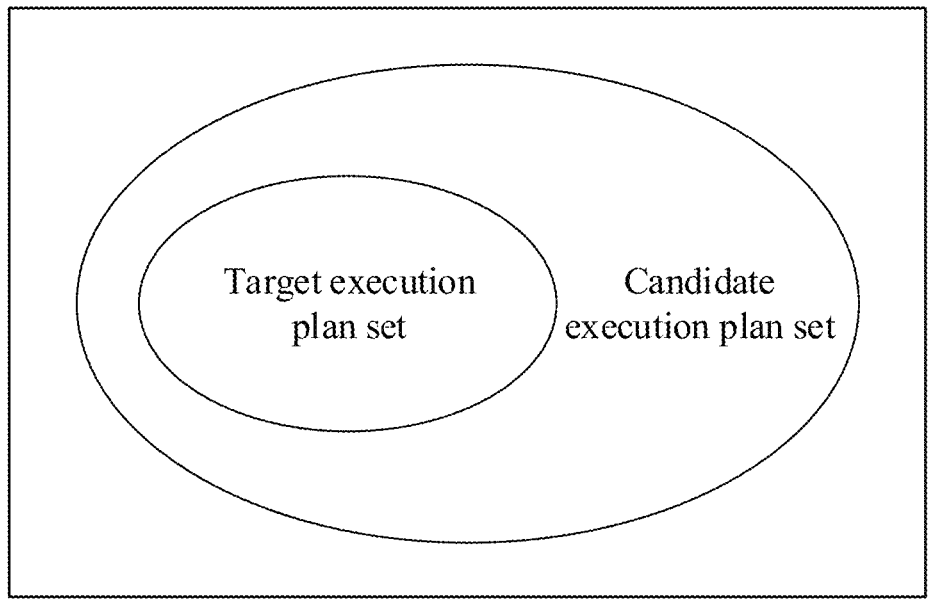
FIG. 5 is a schematic diagram of a relationship between target execution plans and candidate execution plans according to another embodiment of the present disclosure.

It should also be noted that, as shown in FIG. 5, it is a schematic diagram of a relationship between target execution plans and candidate execution plans. Here, the plurality of target execution plans (including the first target execution plans, the second target execution plans, the third target execution plans, and the fourth target execution plans) are subsets of the plurality of candidate execution plans. When the plurality of candidate execution plans are screened to obtain the plurality of target execution plans, the execution costs of the target execution plans may be updated in combination with the monitoring data of the data nodes; the plurality of candidate execution plans may not be screened, that is, the execution costs of all the candidate execution plans are updated in combination with the monitoring data of the data nodes, which is not limited in the present disclosure. Also, one or more monitoring items may be contained in the monitoring data, which is not limited in the present disclosure.

The embodiment of the present disclosure is implemented on the premise that the monitoring data of the data node is obtained. The cases of obtaining the monitoring data will be described below.

In some embodiments, obtaining the monitoring data may be implemented as: obtaining the pre-aggregated monitoring data periodically.

Here, the interval time for obtaining the pre-aggregated monitoring data, i.e., the regular time point, may be formulated according to actual requirements, and is not limited in the present disclosure.

In the embodiment of the present disclosure, the case of obtaining the pre-aggregated monitoring data periodically is beneficial to save system resources to a certain extent compared to the case of obtaining the pre-aggregated monitoring data in real time.

In addition, in some special cases, the related operations on the pre-aggregated monitoring data may also be performed when the regular time point is not reached.

In some embodiments, obtaining the monitoring data may also be implemented as: in response to a preset event, obtaining the pre-aggregated monitoring data when the regular time point is not reached.

Here, the preset event may be set according to actual requirements, and is not limited in the present disclosure. For example, when the preset event occurs, such as when the target query request requires a large number of node resources in the data node to execute a candidate execution plan, the pre-aggregated monitoring data may be actively obtained before the regular time point, to judge whether the data node corresponding to the monitoring data has the corresponding processing capability, and the execution cost required when the data node has the corresponding processing capability. When the data node has no corresponding processing capability, the candidate execution plan containing the data node is discarded. When all data nodes involved in the candidate execution plans have corresponding processing capabilities, the candidate execution plan with the lowest total execution cost is used as the final execution plan for the target query request, so as to improve the accuracy of query optimization.

In some embodiments, obtaining the monitoring data may also be implemented as: receiving the monitoring data, where the monitoring data is sent when a critical event occurs.

Here, the critical event may be set according to actual requirements, and is not limited in the present disclosure. For example, when the critical event occurs, such as when it is known that one or some certain data nodes have been changed greatly, for example, a data node is suddenly occupied by a large number of other tasks to be processed so that the overall performance of the data node exceeds the monitoring threshold, the data node actively provides the pre-aggregated monitoring data before the regular time point, to facilitate the screening operation in the query optimization process based on the monitoring data. Here, the monitoring threshold is used to judge whether the fluctuation of performance of a data node exceeds expectation.

In addition to the original monitoring data such as processor usage rate, network status, network delay parameter and task planning to be executed, the high-level data may also be obtained through statistics and analysis based on the original monitoring data. For example, the timing prediction data may be used as a kind of task planning to be executed to affect the execution cost. The periodic task may also be used as a kind of task planning to be executed to affect the execution cost.

In short, the task planning to be executed may be a known task arrangement, or may be the periodic characteristic such as processor usage rate or network status obtained based on the historical monitoring data (for example, the processor usage rate reaches a peak at 8 o'clock in the morning every day), or may be the timing prediction data obtained based on the task planning to be executed.

Specifically, for example, it is assumed that there are two candidate execution plans, which are completing the hash join operation of the tables T1 and T2 on the data node A and the data node B respectively. The I/O costs, CPU costs and network costs of these two candidate execution plans are approximate. If the CPU usage rate of the data node A (not the CPU cost of this hash join operation) is 95% and the CPU usage rate of the data node B is 20%, obviously it is better to perform the hash join operation on the data node B, because the data node B has more abundant computing resources and it is also more conducive to reasonable allocation of computing resources.

Continuing with the above example, if the CPU usage rate of the data node A and the CPU usage rate of the data node B are both 20% and the data node A will receive a large number of query requests occupying the CPU after 10 seconds in the case of using the prophet (timing prediction) method for prediction, then it is better to perform the hash join operation on the data node B.

For another example, there are currently two data nodes C and D, which are running replicas (Ct3, Dt3) of the table T3 respectively, where Ct3 and Dt3 are two copies of the table T3 respectively; and there are also two data nodes E and F, which are running replicas (Et4, Ft4) of the table T4 respectively, where Et4 and Ft4 are two copies of the table T4 respectively. Now the inner join operation needs to be performed on the tables T3 and T4, and then the cost of the inner join needs to be calculated. Assuming that the table T3 is very large and the table T4 is very small, then it is obviously optimal to copy the table T4 to the table T3. Then four solutions will be generated: Et2→Ct1, Et2→Dt1, Ft2→Ct1, Ft2→Dt1. After the analysis and prediction of the network states of the two data nodes, it is found that the network bandwidths of the data nodes E→C and E→D are basically fully occupied after 1 second, making effective migration impossible; and at the same time, there are more complex calculations on the data node C with a higher CPU occupancy rate. Therefore, considering the above situation, the solution Ft2→Dt1 should be selected. The cost may be calculated as follows: for example, for the tables T3 and T4, the cost of the inner join operation calculated based on the query optimizer is expressed as: cost(local T3 inner join T4)=cost (DiskIO)+cost(CPU)+size(t3)*size(t4), where cost (DiskIO) represents the estimated I/O cost, cost (CPU) represents the estimated CPU cost, size(t3) represents the size of the table T3, and size(t4) represents the size of the table T4.

Taking into account the network status and CPU usage rate, the cost of executing the inner join operation of the tables T3 and T4 in the data node D in the distributed database is expressed as: cost (distributed T3 inner join T4)=cost (#Network)+cost (Network_usage)+cost(local T3 inner join T4)+cost(#CPU). cost(#Network) represents the network status, and may include the current actual network status and the network occupancy in a period of time in the future; cost(Network_usage) represents the estimated network resources required to perform the inner join operation; cost(local T3 inner join T4) represents the estimated local resources required to perform the T3 inner join T4 operation; and cost(#CPU) represents the current network status of the data node involved and the estimated additional CPU usage rate in a period of time in the future.

Figure 6:
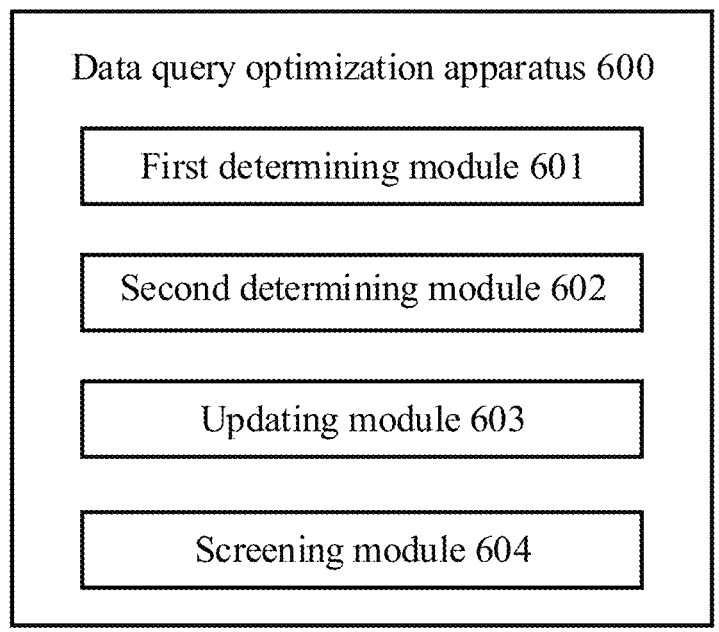
FIG. 6 is a structural schematic diagram of a data query optimization apparatus according to another embodiment of the present disclosure.

Based on the same technical concept, an embodiment of the present disclosure provides a data query optimization apparatus 600, as shown in FIG. 6, including:
 a first determining module 601 configured to determine a plurality of candidate execution plans for a target query request;
 a second determining module 602 configured to determine execution costs of the plurality of candidate execution plans;
 an updating module 603 configured to update the execution costs of the plurality of candidate execution plans based on monitoring data of data nodes involved in the plurality of candidate execution plans, to obtain final costs of the plurality of candidate execution plans; and
 a screening module 604 configured to screen out a final execution plan for the target query request from the plurality of candidate execution plans based on the final costs of the plurality of candidate execution plans.

In some embodiments, the monitoring data includes at least one of:
 processor usage rate, network status, network delay parameter, and task planning to be executed.

In some embodiments, when the monitoring data includes the processor usage rate, the updating module includes:
 a first updating unit configured to, for a plurality of first target execution plans with differences between execution costs less than a first difference threshold, update the execution costs of the plurality of first target candidate execution plans based on a positive correlation between the final cost and the processor usage rate.

In some embodiments, when the monitoring data includes the network status, the updating module includes:
 a first determining unit configured to determine a degree of network congestion based on the network status; and
 a second updating unit configured to, for a plurality of second target execution plans with differences between execution costs less than a second difference threshold, update the execution costs of the plurality of second target candidate execution plans based on a positive correlation between the final cost and the degree of network congestion.

In some embodiments, when the monitoring data includes the network delay parameter, the updating module includes:
 a third updating unit configured to, for a plurality of third target execution plans with differences between execution costs less than a third difference threshold, update the execution costs of the plurality of third target candidate execution plans based on a positive correlation between the final cost and the network delay parameter.

In some embodiments, when the monitoring data includes the task planning to be executed, the updating module includes:

an estimation unit configured to estimate the amount of node resources consumed by the task planning to be executed within a specified duration in future; and a fourth updating unit configured to, for a plurality of fourth target execution plans with differences between execution costs less than a fourth difference threshold, update the execution costs of the plurality of fourth target candidate execution plans based on a positive correlation between the final cost and the amount of node resources.

In some embodiments, the updating module further includes:

a second determining unit configured to, for a candidate execution plan to be processed among the plurality of candidate execution plans, determine an operation node of the candidate execution plan to be processed;

a fifth updating unit configured to update a sub-cost of the operation node in the execution cost based on monitoring data of a data node involved in the operation node; and an aggregating unit configured to aggregate updated sub-costs of operation nodes contained in the candidate execution plan to be processed, to obtain the final cost of the candidate execution plan to be processed.

In some embodiments, the monitoring data is obtained in the updating module, including:

an obtaining unit configured to obtain the pre-aggregated monitoring data periodically.

For the description of specific functions and examples of the modules and sub-modules of the apparatus of the embodiment of the present disclosure, reference may be made to the relevant description of the corresponding steps in the above-mentioned method embodiments, and details are not repeated here.

According to the embodiments of the present disclosure, the present disclosure also provides an electronic device, a readable storage medium and a computer program product.

Figure 7:
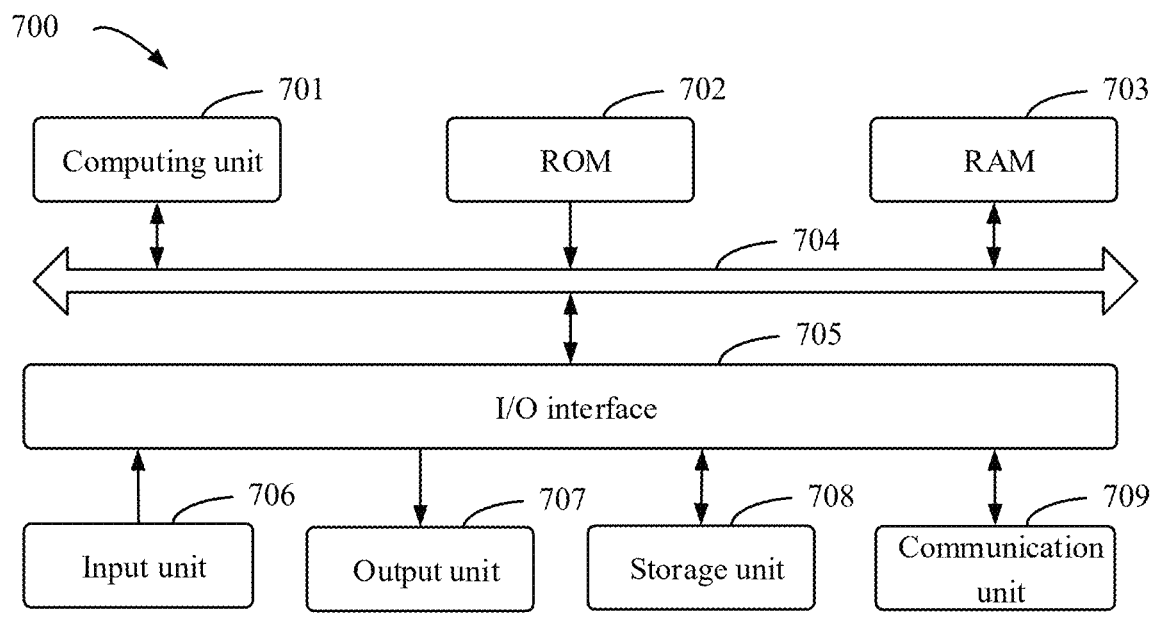
FIG. 7 is a block diagram of an electronic device used to implement the data query optimization method according to an embodiment of the present disclosure.

FIG. 7 shows a schematic block diagram of an exemplary electronic device 700 that may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital assistant, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 7, the device 700 includes a computing unit 701 that may perform various appropriate actions and processes according to a computer program stored in a Read-Only Memory (ROM) 702 or a computer program loaded from a storage unit 708 into a Random Access Memory (RAM) 703. Various programs and data required for an operation of device 700 may also be stored in the RAM 703. The computing unit 701, the ROM 702 and the RAM 703 are connected to each other through a bus 704. The input/output (I/O) interface 705 is also connected to the bus 704.

A plurality of components in the device 700 are connected to the I/O interface 705, and include an input unit 706 such as a keyboard, a mouse, or the like; an output unit 707 such as various types of displays, speakers, or the like; the storage unit 708 such as a magnetic disk, an optical disk, or the like; and a communication unit 709 such as a network card, a modem, a wireless communication transceiver, or the like. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 701 performs various methods and processing described above, such as the data query optimization method. For example, in some implementations, the data query optimization method may be implemented as a computer software program tangibly contained in a computer-readable medium, such as the storage unit 708. In some implementations, a part or all of the computer program may be loaded and/or installed on the device 700 via the ROM 702 and/or the communication unit 709. When the computer program is loaded into the RAM 703 and executed by the computing unit 701, one or more steps of the data query optimization method described above may be performed. Alternatively, in other implementations, the computing unit 701 may be configured to perform the data query optimization method by any other suitable means (e.g., by means of firmware).

Various implementations of the system and technologies described above herein may be implemented in a digital electronic circuit system, an integrated circuit system, a Field Programmable Gate Array (FPGA), an Application Specific Integrated Circuit (ASIC), an Application Specific Standard Product (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

According to the implementations of the present disclosure, the electronic device may be integrated with the communication component, the display screen and the information collection device, or may be provided separately from the communication component, the display screen and the information collection device.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the principle of the present disclosure shall be included in the protection scope of the present disclosure.

What is claimed is:

1. A data query optimization method, comprising:
determining a plurality of candidate execution plans for a target query request;
determining execution costs of the plurality of candidate execution plans;
updating the execution costs of the plurality of candidate execution plans based on monitoring data of data nodes involved in the plurality of candidate execution plans, to obtain final costs of the plurality of candidate execution plans, comprising:
for a candidate execution plan to be processed among the plurality of candidate execution plans, determining all operation nodes contained in the candidate execution plan to be processed;
updating a sub-cost of each operation node in the execution cost based on monitoring data of each data node involved in the operation node, wherein the operation node includes one or more data nodes, and the monitoring data of the data node comprises at least one of: processor usage rate of the data node, network status indicating connection between the data node and a network, network delay parameter indicating a delay condition of the data node, or task planning to be executed which refers to a planning of the data node for other tasks to be executed in addition to the candidate execution plan to be processed; and
aggregating updated sub-costs of the operation nodes contained in the candidate execution plan to be processed, to obtain the final cost of the candidate execution plan to be processed; and
screening out a final execution plan for the target query request from the plurality of candidate execution plans based on the final costs of the plurality of candidate execution plans.

2. The method of claim 1, wherein, in a case of the monitoring data comprises the processor usage rate, the updating the execution costs of the plurality of candidate execution plans comprises:
for a plurality of first target execution plans with differences between execution costs less than a first difference threshold, updating the execution costs of the plurality of first target candidate execution plans based on a positive correlation between the final cost and the processor usage rate.

3. The method of claim 1, wherein, in a case of the monitoring data comprises the network status, the updating the execution costs of the plurality of candidate execution plans comprises:
determining a degree of network congestion based on the network status; and for a plurality of second target execution plans with differences between execution costs less than a second difference threshold, updating the execution costs of the plurality of second target candidate execution plans based on a positive correlation between the final cost and the degree of network congestion.

4. The method of claim 1, wherein, in a case of the monitoring data comprises the network delay parameter, the updating the execution costs of the plurality of candidate execution plans comprises:
for a plurality of third target execution plans with differences between execution costs less than a third difference threshold, updating the execution costs of the plurality of third target candidate execution plans based on a positive correlation between the final cost and the network delay parameter.

5. The method of claim 1, wherein, in a case of the monitoring data comprises the task planning to be executed, the updating the execution costs of the plurality of candidate execution plans comprises:
estimating the amount of node resources consumed by the task planning to be executed within a specified duration in future; and
for a plurality of fourth target execution plans with differences between execution costs less than a fourth difference threshold, updating the execution costs of the plurality of fourth target candidate execution plans based on a positive correlation between the final cost and the amount of node resources.

6. The method of claim 1, wherein obtaining the monitoring data comprises:
obtaining the pre-aggregated monitoring data periodically.

7. An electronic device, comprising:
at least one processor; and
a memory connected in communication with the at least one processor;
wherein the memory stores an instruction executable by the at least one processor, and the instruction, when executed by the at least one processor, enables the at least one processor to execute:
determining a plurality of candidate execution plans for a target query request;
determining execution costs of the plurality of candidate execution plans;
updating the execution costs of the plurality of candidate execution plans based on monitoring data of data nodes involved in the plurality of candidate execution plans, to obtain final costs of the plurality of candidate execution plans, by:
for a candidate execution plan to be processed among the plurality of candidate execution plans, determining all operation nodes contained in the candidate execution plan to be processed;
updating a sub-cost of each operation node in the execution cost based on monitoring data of each data node involved in the operation node, wherein the operation node includes one or more data nodes, and the monitoring data of the data node comprises at least one of: processor usage rate of the data node, network status indicating connection between the data node and a network, network delay parameter indicating a delay condition of the data node, or task planning to be executed which refers to a planning of the data node for other tasks to be executed in addition to the candidate execution plan to be processed; and aggregating updated sub-costs of the operation nodes contained in the candidate execution plan to be processed, to obtain the final cost of the candidate execution plan to be processed; and
screening out a final execution plan for the target query request from the plurality of candidate execution plans based on the final costs of the plurality of candidate execution plans.

8. The electronic device of claim 7, wherein, in a case of the monitoring data comprises the processor usage rate, the updating the execution costs of the plurality of candidate execution plans comprises:
for a plurality of first target execution plans with differences between execution costs less than a first difference threshold, updating the execution costs of the plurality of first target candidate execution plans based on a positive correlation between the final cost and the processor usage rate.

9. The electronic device of claim 7, wherein, in a case of the monitoring data comprises the network status, the updating the execution costs of the plurality of candidate execution plans comprises:
determining a degree of network congestion based on the network status; and
for a plurality of second target execution plans with differences between execution costs less than a second difference threshold, updating the execution costs of the plurality of second target candidate execution plans based on a positive correlation between the final cost and the degree of network congestion.

10. The electronic device of claim 7, wherein, in a case of the monitoring data comprises the network delay parameter, the updating the execution costs of the plurality of candidate execution plans comprises:
for a plurality of third target execution plans with differences between execution costs less than a third difference threshold, updating the execution costs of the plurality of third target candidate execution plans based on a positive correlation between the final cost and the network delay parameter.

11. The electronic device of claim 7, wherein, in a case of the monitoring data comprises the task planning to be executed, the updating the execution costs of the plurality of candidate execution plans comprises:
estimating the amount of node resources consumed by the task planning to be executed within a specified duration in future; and
for a plurality of fourth target execution plans with differences between execution costs less than a fourth difference threshold, updating the execution costs of the plurality of fourth target candidate execution plans based on a positive correlation between the final cost and the amount of node resources.

12. The electronic device of claim 7, wherein, obtaining the monitoring data comprises:
obtaining the pre-aggregated monitoring data periodically.

13. A non-transitory computer-readable storage medium storing a computer instruction thereon, wherein the computer instruction is used to cause a computer to execute:
determining a plurality of candidate execution plans for a target query request;
determining execution costs of the plurality of candidate execution plans;
updating the execution costs of the plurality of candidate execution plans based on monitoring data of data nodes involved in the plurality of candidate execution plans, to obtain final costs of the plurality of candidate execution plans, by:
- for a candidate execution plan to be processed among the plurality of candidate execution plans, determining all operation nodes contained in the candidate execution plan to be processed;
- updating a sub-cost of each operation node in the execution cost based on monitoring data of each data node involved in the operation node, wherein the operation node includes one or more data nodes, and the monitoring data of the data node comprises at least one of: processor usage rate of the data node, network status indicating connection between the data node and a network, network delay parameter indicating a delay condition of the data node, or task planning to be executed which refers to a planning of the data node for other tasks to be executed in addition to the candidate execution plan to be processed; and
- aggregating updated sub-costs of the operation nodes contained in the candidate execution plan to be processed, to obtain the final cost of the candidate execution plan to be processed; and screening out a final execution plan for the target query request from the plurality of candidate execution plans based on the final costs of the plurality of candidate execution plans.

14. The non-transitory computer-readable storage medium of claim 13, wherein, in a case of the monitoring data comprises the processor usage rate, the updating the execution costs of the plurality of candidate execution plans comprises:
- for a plurality of first target execution plans with differences between execution costs less than a first difference threshold, updating the execution costs of the plurality of first target candidate execution plans based on a positive correlation between the final cost and the processor usage rate.

15. The non-transitory computer-readable storage medium of claim 13, wherein, in a case of the monitoring data comprises the network status, the updating the execution costs of the plurality of candidate execution plans comprises:
- determining a degree of network congestion based on the network status; and
- for a plurality of second target execution plans with differences between execution costs less than a second difference threshold, updating the execution costs of the plurality of second target candidate execution plans based on a positive correlation between the final cost and the degree of network congestion.

16. The non-transitory computer-readable storage medium of claim 13, wherein, in a case of the monitoring data comprises the network delay parameter, the updating the execution costs of the plurality of candidate execution plans comprises:
- for a plurality of third target execution plans with differences between execution costs less than a third difference threshold, updating the execution costs of the plurality of third target candidate execution plans based on a positive correlation between the final cost and the network delay parameter.

17. The non-transitory computer-readable storage medium of claim 13, wherein, in a case of the monitoring data comprises the task planning to be executed, the updating the execution costs of the plurality of candidate execution plans comprises:
- estimating the amount of node resources consumed by the task planning to be executed within a specified duration in future; and
- for a plurality of fourth target execution plans with differences between execution costs less than a fourth difference threshold, updating the execution costs of the plurality of fourth target candidate execution plans based on a positive correlation between the final cost and the amount of node resources.

18. The non-transitory computer-readable storage medium of claim 13, wherein, obtaining the monitoring data comprises:
- obtaining the pre-aggregated monitoring data periodically.

* * * * *